(12) United States Patent  
Eickhoff et al.

(10) Patent No.: US 11,549,635 B2
(45) Date of Patent: Jan. 10, 2023

(54) THERMAL ENCLOSURE

(71) Applicant: Intelligent Energy Limited, Loughborough (GB)

(72) Inventors: Steven J. Eickhoff, Brooklyn Park, MN (US); Jeffrey Michael Klein, Minneapolis, MN (US); Christopher J. Zins, Coon Rapids, MN (US)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/632,778

(22) Filed: Jun. 26, 2017

(65) Prior Publication Data

US 2018/0003334 A1 Jan. 4, 2018

Related U.S. Application Data

(60) Provisional application No. 62/356,616, filed on Jun. 30, 2016.

(51) Int. Cl.
*H01M 8/2475* (2016.01)
*F16L 59/02* (2006.01)
(Continued)

(52) U.S. Cl.
CPC ............ *F16L 59/029* (2013.01); *B32B 7/027* (2019.01); *B32B 15/08* (2013.01); *F16L 59/07* (2013.01);
(Continued)

(58) Field of Classification Search
CPC ..... F16L 59/029; F16L 59/07; H01M 8/2475; B32B 3/08; B32B 1/02; B32B 5/16; B32B 5/02; B32B 27/08; B32B 7/02; B32B 7/005; B32B 2439/00; B32B 2307/304; B32B 2264/12; B32B 2264/107;
(Continued)

(56) References Cited

U.S. PATENT DOCUMENTS

| 4,636,415 A | 1/1987 | Barito et al. |
| 5,032,439 A | 7/1991 | Glicksman et al. |

(Continued)

FOREIGN PATENT DOCUMENTS

| AU | 2014316348 | 1/2016 |
| CN | 102873966 A | 1/2013 |

(Continued)

OTHER PUBLICATIONS

"European Application Serial No. 17178079.4, Response filed Apr. 20, 2018 to Extended European Search Report dated Nov. 16, 2017", 31 pgs.

(Continued)

*Primary Examiner* — Kwang Han
(74) *Attorney, Agent, or Firm* — Baker Hostetler LLP

(57) ABSTRACT

A thermal insulation device includes a first plate, a second plate formed to nest adjacent the first plate with a gap between the first and second plates, a porous material disposed between the plates, and a sealing layer disposed between the first and second plates such that the porous material is sealed from ambient at a pressure less than ambient. Multiple such sets of plates may be used to form an enclosure for a device that thermally insulates the device from ambient.

11 Claims, 7 Drawing Sheets

(51) Int. Cl.
  *B32B 15/08* (2006.01)
  *B32B 7/027* (2019.01)
  *F16L 59/07* (2006.01)

(52) U.S. Cl.
  CPC ....... *H01M 8/2475* (2013.01); *B32B 2264/12* (2013.01); *B32B 2307/30* (2013.01); *B32B 2307/304* (2013.01); *B32B 2309/68* (2013.01); *B32B 2439/00* (2013.01)

(58) Field of Classification Search
  CPC ........ B32B 2264/102; B32B 2264/101; B32B 2307/30; B32B 2262/101; B32B 2250/40; B32B 2250/03; B32B 2309/68; B32B 15/08; Y02E 60/50
  See application file for complete search history.

(56) References Cited

U.S. PATENT DOCUMENTS

| | | | |
|---|---|---|---|
| 5,252,408 A | 10/1993 | Bridges et al. | |
| 5,512,345 A | 4/1996 | Tsutsumi et al. | |
| 5,609,934 A | 3/1997 | Fay | |
| 6,168,040 B1 | 1/2001 | Sautner et al. | |
| 6,838,146 B2 | 1/2005 | Merrill | |
| 6,859,364 B2 | 2/2005 | Yuasa et al. | |
| 10,160,184 B2* | 12/2018 | Conolly | B32B 5/024 |
| 2002/0114937 A1* | 8/2002 | Albert | C04B 38/0022 |
| | | | 428/304.4 |
| 2006/0261304 A1* | 11/2006 | Muthukumaran | H01M 8/04007 |
| | | | 252/62 |
| 2007/0128420 A1* | 6/2007 | Maghribi | A61L 27/48 |
| | | | 428/221 |
| 2007/0295734 A1* | 12/2007 | Nakajima | F16L 59/065 |
| | | | 220/592.22 |
| 2009/0179541 A1 | 7/2009 | Smith et al. | |
| 2009/0191436 A1 | 7/2009 | Wunning et al. | |
| 2014/0353317 A1 | 12/2014 | Ranade et al. | |
| 2015/0241118 A1* | 8/2015 | Wu | F25D 23/065 |
| | | | 428/426 |
| 2017/0214010 A1* | 7/2017 | Kerspe | H01M 50/20 |
| 2018/0006316 A1 | 1/2018 | Eickhoff et al. | |

FOREIGN PATENT DOCUMENTS

| | | | |
|---|---|---|---|
| CN | 104870881 A | 8/2015 | |
| CN | 107565067 | 1/2018 | |
| CN | 107565072 | 1/2018 | |
| EP | 2947369 A1 | 11/2015 | |
| EP | 2989025 A1 | 3/2016 | |
| JP | 04-309778 A | 11/1992 | |
| JP | 06-100051 A | 4/1994 | |
| JP | H10-083832 A | 3/1998 | |
| JP | 11-130187 A | 5/1999 | |
| JP | 2002-081595 A | 3/2002 | |
| JP | 2002-310383 A | 10/2002 | |
| JP | 2011-111753 A | 6/2011 | |
| WO | 2014184393 | 11/2014 | |
| WO | WO2014-184393 | * 11/2014 | ............... B32B 5/00 |

OTHER PUBLICATIONS

"European Application Serial No. 17178078.6, Partial European Search Report dated Oct. 23, 2017", 17 pgs.
Abe, Hiroya, et al., "Dry Powder Processing of Fibrous Fumed Silica Compacts for Thermal Insulation", *Am. Ceram. Soc.*, 88(5), (2005), 1359-1361.
Alama, M., et al., "Experimental characterisation and evaluation of the thermo-physical properties of expanded perlite—fumed silica composite for effective vacuum insulation panel (VIP) core", *Energy and Buildings*, 69, (2014), 1-24.
Berge, Axel, et al., "Literature Review of High Performance Thermal Insulation", Report 2012:2, Chalmers University of Technology, Gothenburg, Sweden, (2012), 40 pgs.
Davraz, Metin, et al., "Performance properties of vacuum Insulation panels produced with various filling materials", *Science and Engineering of Composite Materials*, (Sep. 2014), 7 pgs.
Eickhoff, Steven J., "Modulated Thermal Conductance Thermal Enclosure", U.S. Appl. No. 15/631,187, filed Jun. 23, 2017, 33 pgs.
Lahousse, Sean W., et al., "Vacuum insulation using perlite powder sealed in plastic and glass", Thesis, Massachusetts Institute of Technology, (Feb. 1993), 70 pgs.
"European Application Serial No. 17178079.4, Extended European Search Report dated Nov. 16, 2017", 9 pgs.
European Patent Application No. 18169494.4; Extended Search Report; dated Dec. 13, 2018; 14 pages.
U.S. Appl. No. 15/631,187, filed Jun. 23, 2017, Modulated Thermal Conductance Thermal Enclosure.

* cited by examiner

THERMAL ENCLOSURE

RELATED APPLICATION

This application claims priority to U.S. Provisional Application Ser. No. 62/356,616 (entitled Thermal Enclosure, filed Jun. 30, 2016) which is incorporated herein by reference.

BACKGROUND

Conventional thermal insulating materials (e.g. polyisocyanurate, polystyrene, polyurethane) cannot meet the thermal resistance requirements of certain applications requiring thin, high performance thermal insulation (e.g. portable fuel cells). Vacuum-based thermal insulators (e.g. vacuum insulated panels) can meet the thermal performance requirements of these applications, but cannot be manufactured in custom form factors.

SUMMARY

A thermal insulation device includes a first plate, a second plate formed to nest adjacent the first plate with a gap between the first and second plates, a porous material disposed between the plates, and a sealing layer disposed between the first and second plates such that the porous material is sealed from ambient at a pressure less than ambient.

A thermal insulation enclosure includes a first plate, a second plate formed to nest adjacent the first plate with a gap between the first and second plates, a porous material disposed between the plates, a sealing layer disposed between the first and second plates such that the porous material is sealed from ambient at a pressure less than ambient, a duplicate set of first and second plates having a porous material and sealing layer formed to mate with the first and second plates to form a chamber, and a device disposed within the chamber that is thermally insulated from ambient by the enclosure.

A method includes pressing a porous material between two plates such that the plates are separated from each other by a gap defined by the porous material, and in a partial vacuum, depositing a conformal sealing layer to cover the porous material in the gap between the two plates to form a gas seal of the porous material from ambient and maintain the partial vacuum.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A vacuum-based thermal insulator provides thermal resistance requirements of applications requiring thin insulation, and can be made in a wide range of custom form factors.

Figure 1:
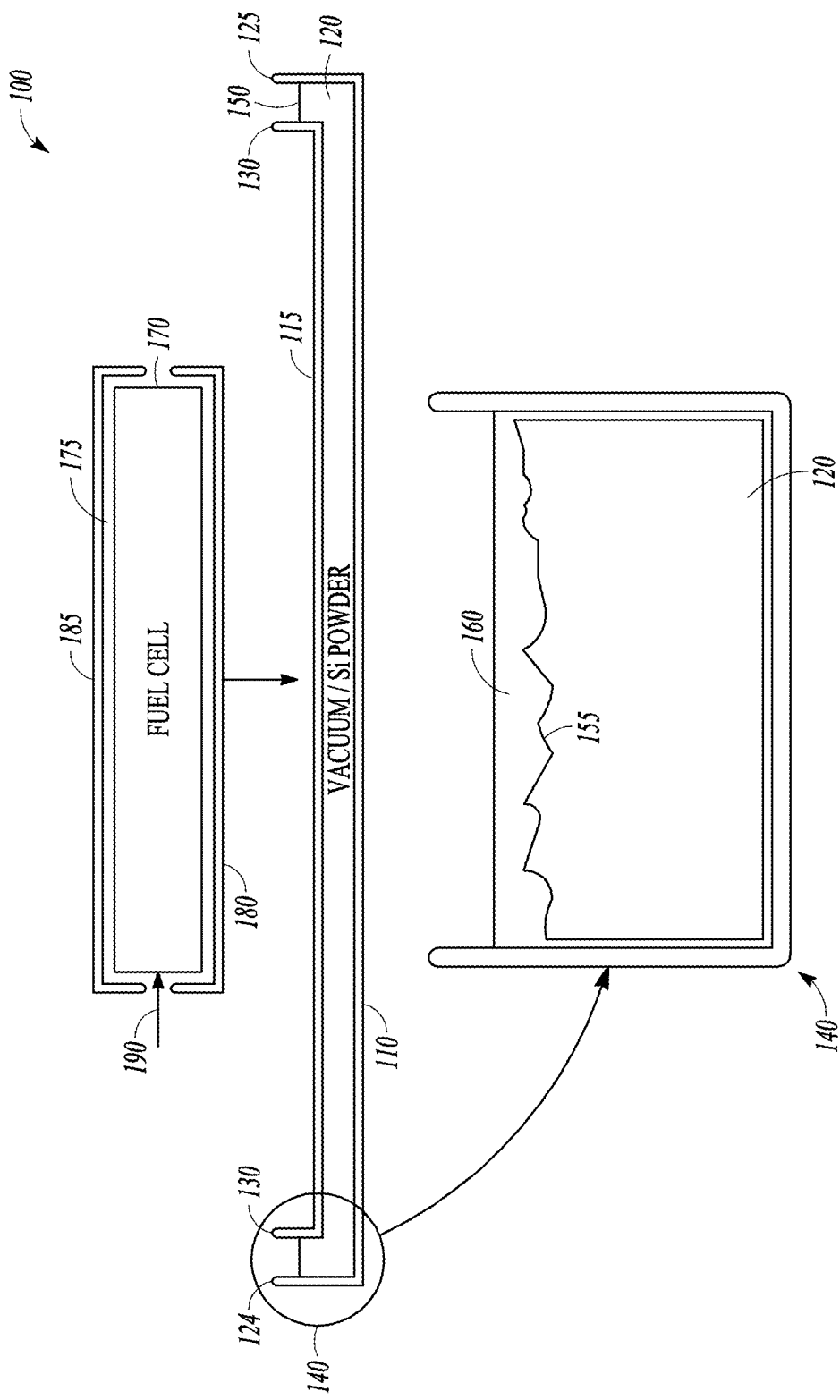
FIG. 1 is a block diagram cross sectional representation of a thermal insulator according to an example embodiment.

FIG. 1 is a block diagram cross section representation of a thermal insulator 100. The thermal insulator may be formed for an outside plate 110 spaced from an inside plate 115 by a nano-porous material 120. In one embodiment, the plates may be similarly shaped and of slightly different sizes such that the inside plate 115 may nest inside the outside plate 110, creating a space between them that the material 120 occupies. In one embodiment, the space may be fairly uniform between the plates.

In one embodiment, the plates have sides indicated at 125 and 130 that extend away from generally planar portions of the plates. The distance between the sides 125 and 130 may be the same as the distance between the generally planar portions of the plates, or may vary in further embodiments. The shape of the generally planar portion of the nested plates may be circular, oval, rectangular, or any other shape desired, such as a polygon. The sides of the plates extend along the entire perimeter of the generally planar portions. In still further embodiments, the generally planar portions of the plates may be curved as opposed to planar. Note that while the distance between the plates and sides of the plates is substantially equal in some embodiments, the distance may be varied in further embodiments where substantially uniform insulation is not needed.

A portion 140 of the sides of the plates is illustrated in further detail in a blown up view also at 140. The blown up view of portion 140 illustrates a sealing layer 150 that helps maintain a vacuum within the nano-porous material 120. In one embodiment, the sealing layer 150 includes a layer of a polymer 155, such as parylene or other low thermally conducting material and a metal layer 160 of low thermally conducting metal, such as aluminum or NiCr for example. A further polymer or other layer may be included in further embodiments.

In one embodiment, the polymer or plastic layer 155 may be between approximately 50 to 200 um thick. The metal layer may be approximately 80 nm thick. The purpose of the sealing layer 150 is to help maintain a vacuum, which may be simply a low pressure as opposed to an absolute vacuum, within the space between the plates. Thus, the thickness of each layer may be varied based on the material used to maintain the vacuum for a desired length of time. Since the metal layer may be more thermally conductive, it is desirable in some embodiments to utilize a metal and a thickness of the metal that minimizes its thermal conductance between the plates. The vacuum provides an area of low thermal conductance, K. As such, it may be varied between absolute and ambient pressure depending on the overall thermal properties desired. Ambient pressure may correspond to atmospheric pressure, which may vary with weather conditions and altitude or depth. In one embodiment, the vacuum is kept between 0 and 100 Pa (Pascal—Newtons/Meter$^2$). Note that the portion 140 shown is provided for illustration of the sealing layer 150 and may not be reflective of the actual shape of the portion 140.

In one embodiment, the material 120 may be a low-density (200-250 kg/m^3) mixture of fumed silica, fiberglass, and silicon carbide (and optionally getter materials to getter gas resulting from outgassing) may be pressed into a custom form factor enclosure, such as the two nesting plates 110 and 115. The fumed silica mixture fills the gap between the two nested plates that comprise an enclosure. The mixture is a nano-porous open cell material in one embodiment such that a significant portion of the value occupied by the material is open, as opposed to closed cell materials. A small gap thermally isolates the two plates; this gap is may be coated with a thin, low-thermal conductivity material (or materials) and forms a gas seal as indicated by sealing layer 150.

The space between the plates is evacuated, forming an enclosure with very high thermal resistance between the inner and outer plates. In one embodiment, a device 170, such as a fuel cell based power generator, can be placed within a pocket 175 created by two enclosures 180 and 185, and provide very high thermal resistance between the interior of the pocket and ambient environment. In the case of some fuel cells, the two enclosures may not be sealed together, to allow at least oxygen, indicated by arrow 190, from ambient to reach the device 170 for operation of the device. In further embodiments, where access to ambient is not needed, the enclosures may be sealed together by glue, welding, clamping, or other means of attaching the enclosures together.

Figure 2:
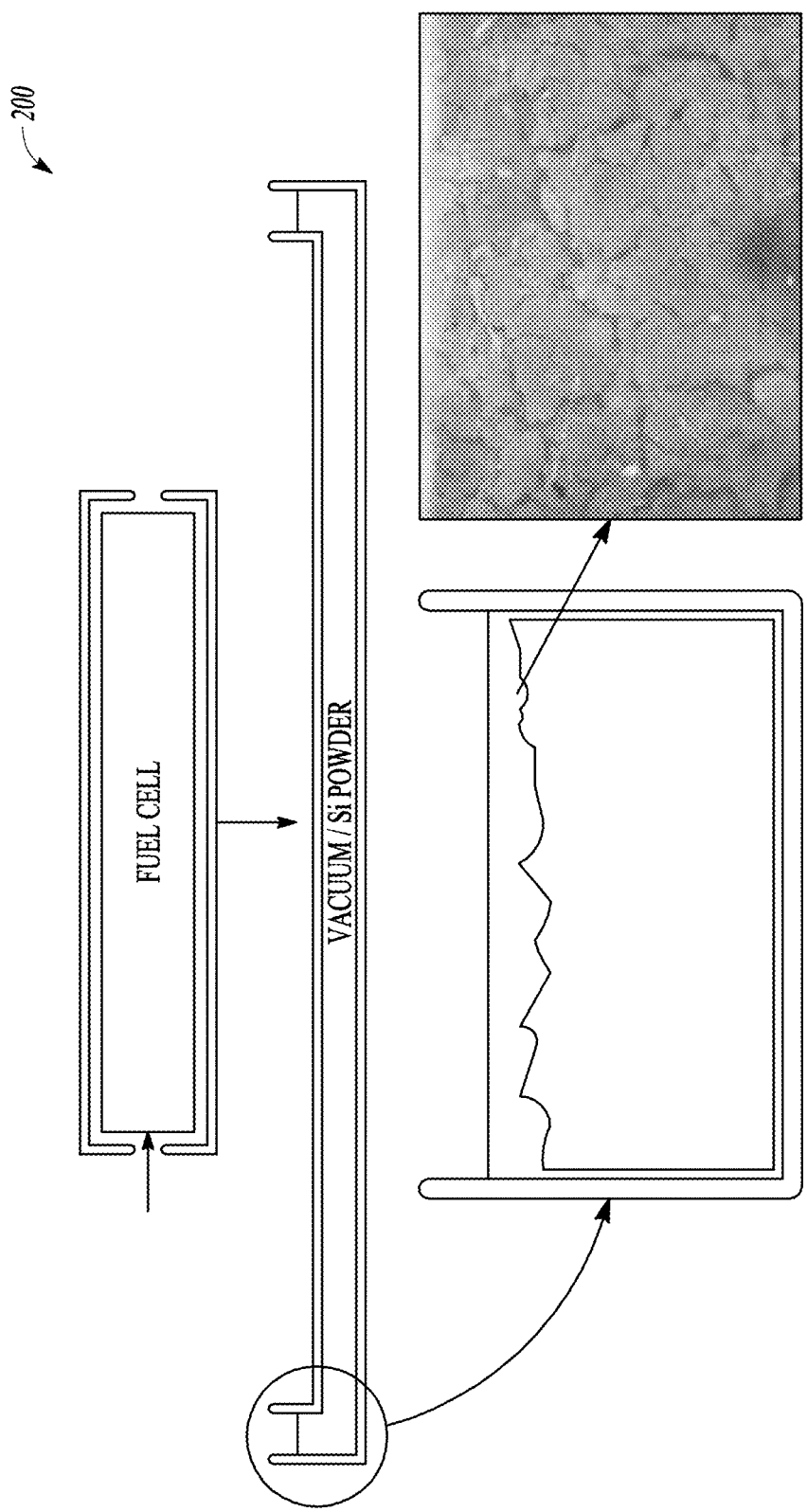
FIG. 2 is a block diagram cross sectional representation of a thermal insulate according to an example embodiment.

FIG. 2 is a block diagram cross section representation of a thermal insulator 200, including example dimensions.

Figure 3A:
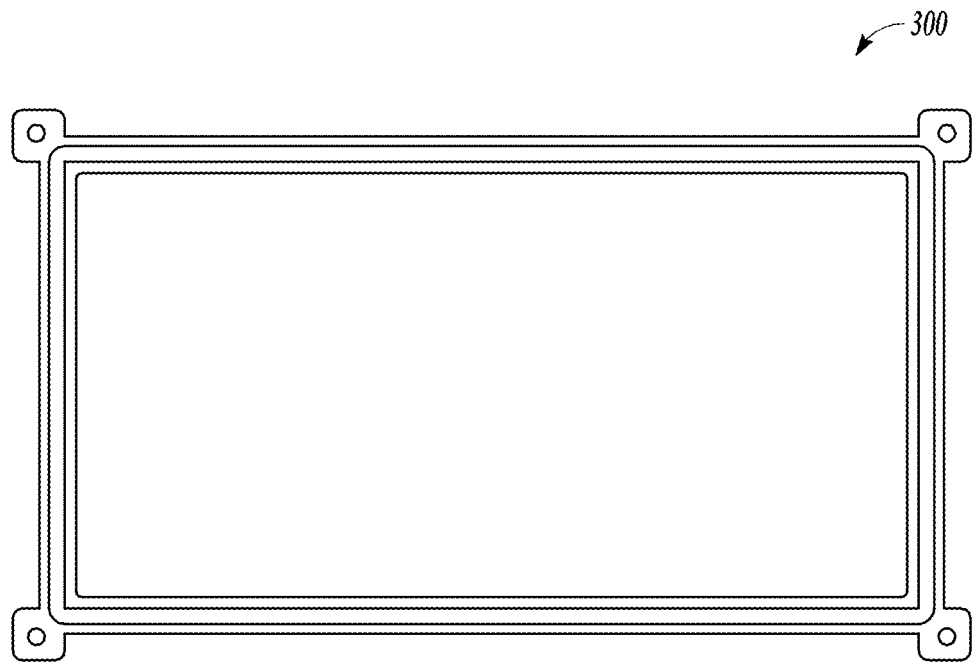
FIGS. 3A, 3B, and 3C are representations of an example test setup for testing thermal conductivity of a single plate in accordance with an example embodiment.
Figure 3B:
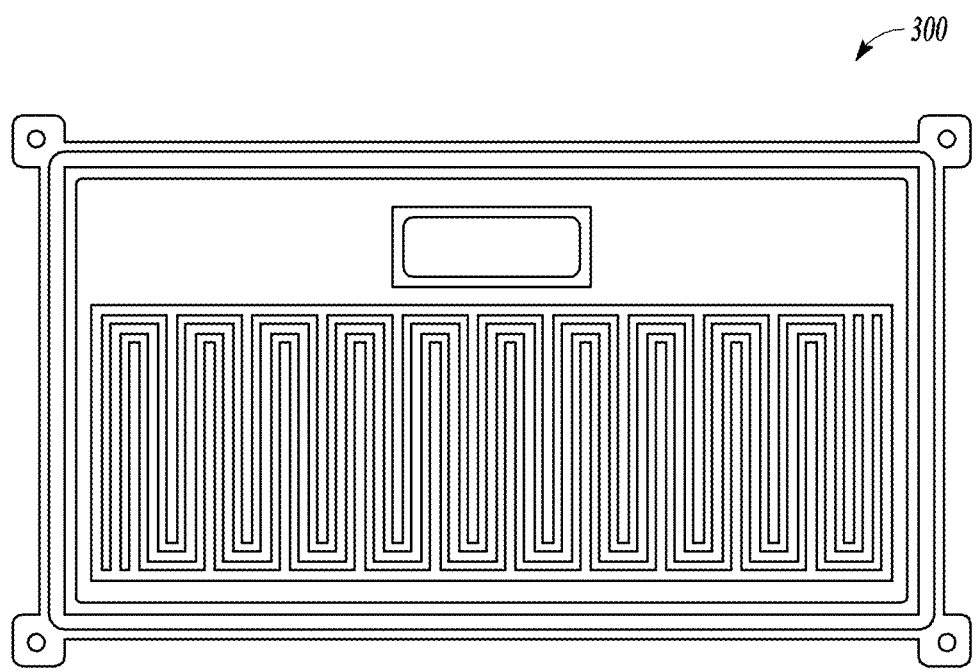
Figure 3C:
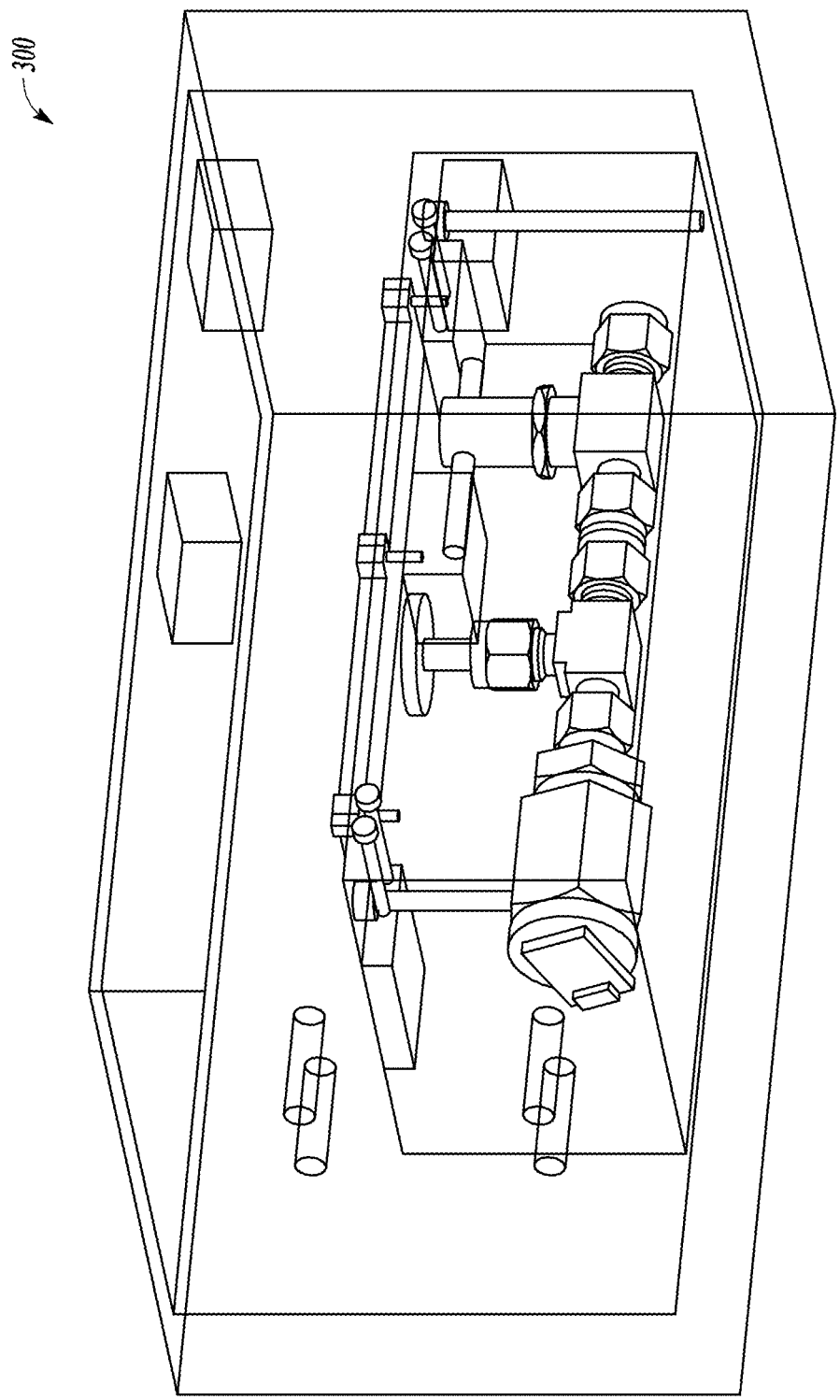

FIGS. 3A, 3B, and 3C are representations of an example test setup 300 for testing thermal conductivity of a single plate in accordance with an example embodiment. A difference in temperature across the plate is sensed for a give power level, 500 mW over an insulating pressure between ambient and a vacuum.

Figures 4A, 4B:
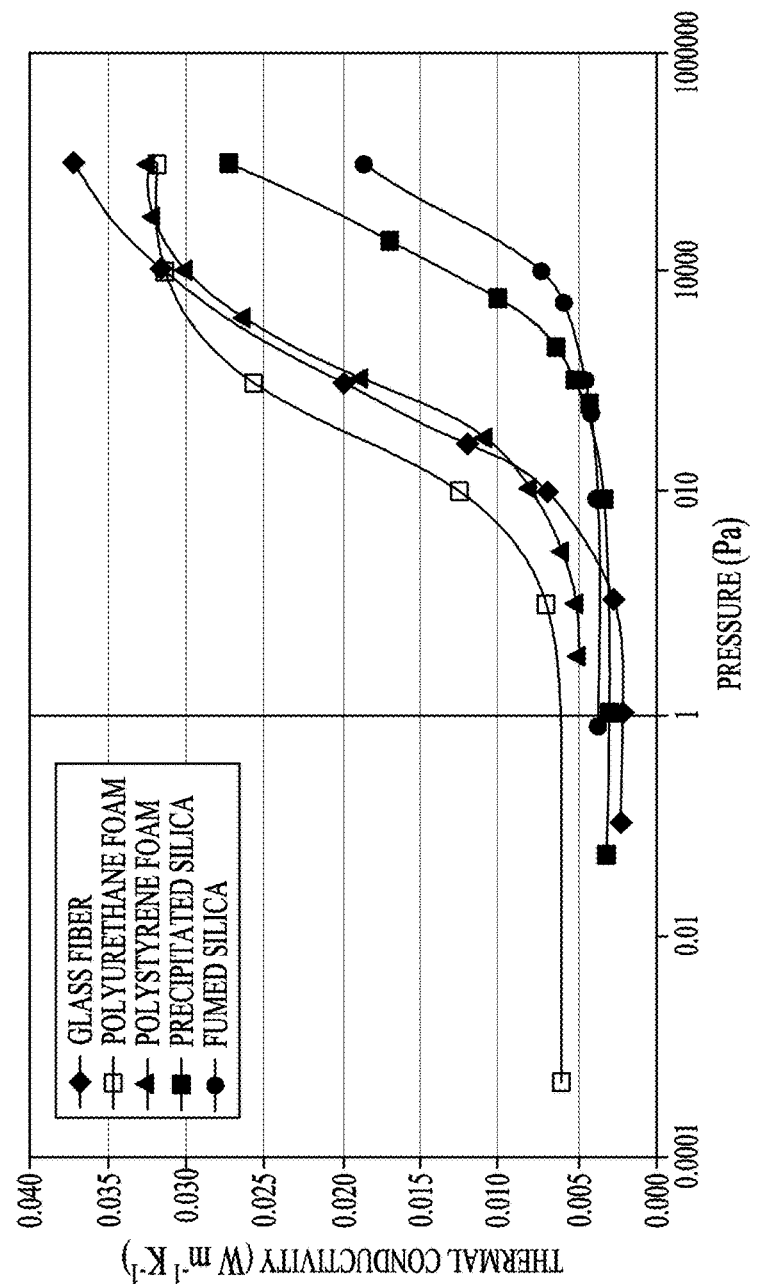
FIGS. 4A and 4B illustrate graphs and tables of preliminary results using the test setup for various insulator materials according to an example embodiment.

FIGS. 4A and 4B illustrate graphs and tables of preliminary results using test setup 300 for various insulator materials, including for example, glass fiber, polyurethane foam, polystyrene foam, precipitated silica, and fumed silica.

Figure 5:
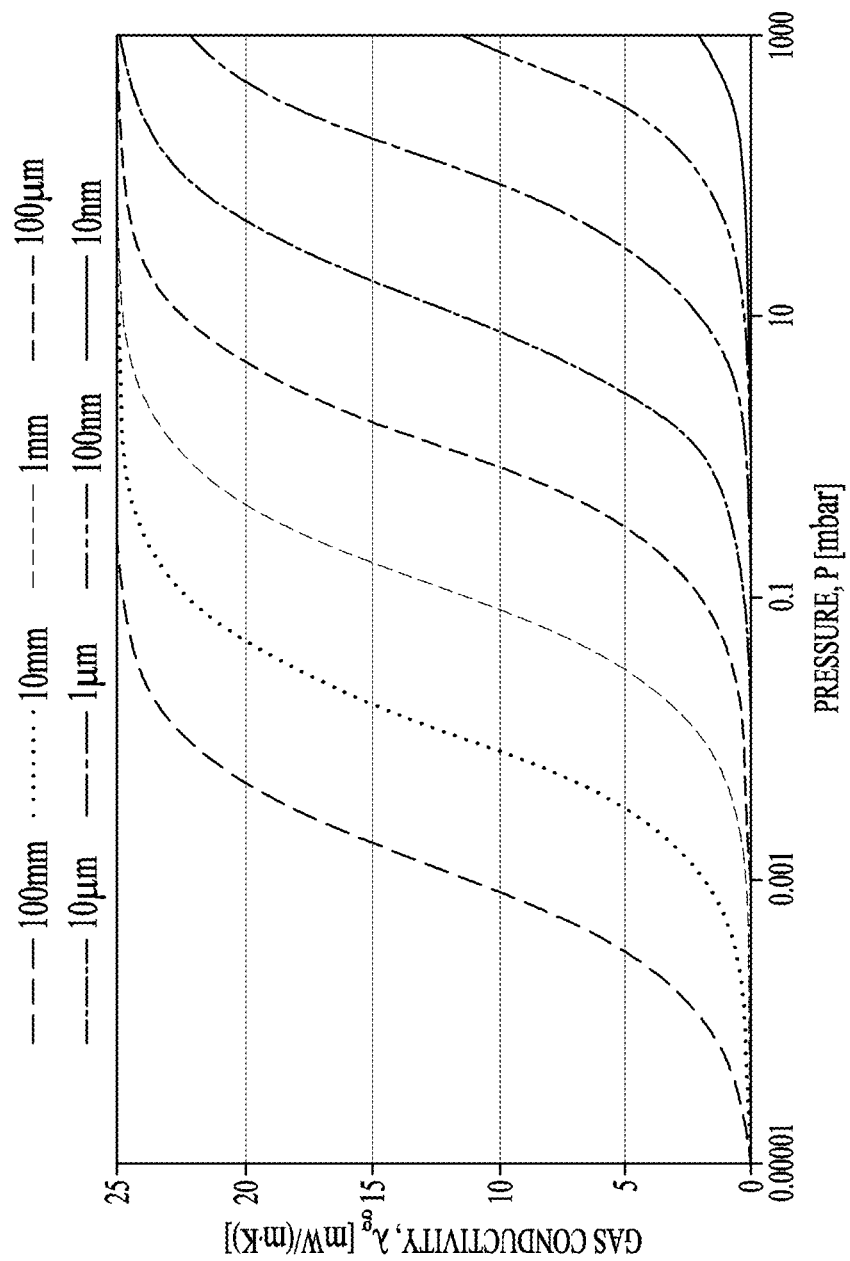
FIG. 5 is a chart illustrating calculated gas conductivity for air as a function of gas pressure for different characteristic system sizes according to an example embodiment.

FIG. 5 is a chart illustrating calculated gas conductivity for air as a function of gas pressure for different characteristic system size according to an example embodiment. The input temperature was 20° C., and the pore sizes are indicated by format of the line at the top of the figure, ranging from 10 nm to 100 mm. Note that the use of pores in the nanometer range allow operation at higher pressures for a same level of thermal conductivity, which may be easier to achieve and maintain over long periods of time.

A method for forming a thermal enclosure is as follows:

1) Mixing a fumed silica, silicon carbide, fiber glass, and optionally getter material to create a nano-porous material. Note that such mixing is well known in the art as described in at least three papers, such as Dry Powder Processing of Fibrous Fumed Silica Compacts for Thermal Insulation Hiroya Abe,*,w Isami Abe, Kazuyoshi Sato,* and Makio Naito* 2005; Experimental characterisation and evaluation of the thermo-physical properties of expanded perlite—Fumed silica composite for effective vacuum insulation panel (VIP) core M. Alama, H. Singha,*, S. Brunnerb, C. Nazirisa 2015; Performance properties of vacuum insulation panels produced with various filling materials Metin Davraz* and Hilmi C. Bayrakci 2014.

In one embodiment, the mixture is composed of 70-90% fumed silica of approximately 10 um grain size, 1-10% SiC powder of approximately 0.5 um grain size, and 5-15% glass fibers, 1-2 mm×10 um. These are mixed mechanically at low speed (<1000 rpm) for several minutes.

2) Pressing the silica mixture between two plates that comprise the enclosure.

3) In a partial vacuum (<1000 Pa), deposit a conformal coating (e.g. 10-100 um of a polymer such as parylene) to cover the silica in the gap between the plates, forming a gas seal.

4) In a partial vacuum (<1000 Pa), deposit a layer of metal (e.g. 10-1000 nm of Al, NiCr) to cover the parylene.

5) Optionally repeat the polymer/metal coating process to create a multi-layer seal which further reduces permeability (increases lifetime)

The fumed silica mixture in one embodiment may be was 2/88/10% SiC/Fumed Silica/Glass fiber.

Figure 6:
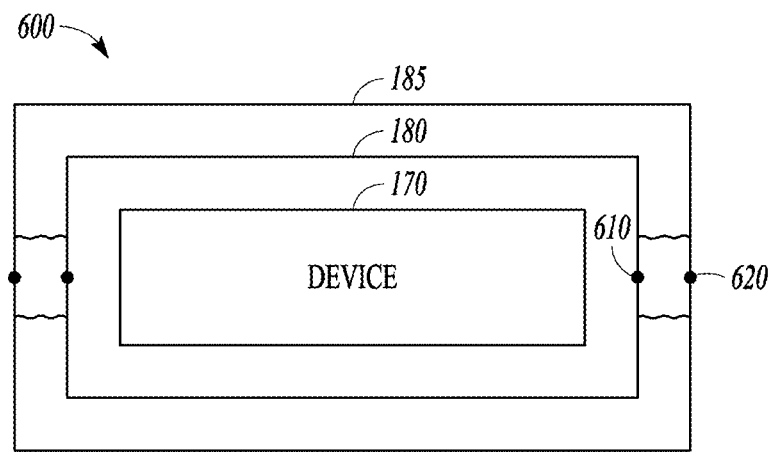
FIG. 6 is a block diagram representation of how two sets of plates are sealed to form an insulating enclosure around a device according to an example embodiment.

FIG. 6 is a block diagram representation of how two sets of plates 180, 185 are sealed at 610, 620 to form an insulating enclosure 600 around device 170. Seal 610 represents a sealing together of outer plates of the sets of plates, while seal 620 represents a sealing together of inner plates of the sets of plates. The seals 610 and 620 may be obtained via weld or adhesive in various embodiments.

EXAMPLES

1. An example thermal insulation device including a first plate, a second plate formed to nest adjacent the first plate with a gap between the first and second plates, a porous material disposed between the plates, and a sealing layer disposed between the first and second plates such that the porous material is sealed from ambient at a pressure less than ambient.

2. The thermal insulation device of example 1 wherein the first and second plates comprise a substantially planar portion and sides, and wherein the sealing layer is disposed between sides of the first and second plates.

3. The thermal insulation device of example 2 wherein the sealing layer comprises a polymer material.

4. The thermal insulation device of example 3 wherein the polymer material is parylene.

5. The thermal insulation device of any of examples 3-4 wherein the sealing layer further comprises a metal layer disposed between the polymer layer and ambient.

6. The thermal insulation device of example 5 and further comprising an additional layer of polymer and metal.

7. The thermal insulation device of any of examples 1-6 wherein the porous material is a nano-porous material comprising an open cell material.

8. The thermal insulation device of any of examples 1-7 wherein the porous material is a nano-porous material comprising a low-density mixture of fumed silica, fiberglass, and silicon carbide.

9. The thermal insulation device of any of examples 1-6 wherein the porous material comprises a getter material.

10. The thermal insulation device of any of examples 1-9 wherein the pressure is between approximately 0 and 1000 Pa (Pascal—Newtons/Meter2).

11. An example thermal insulation enclosure includes a first plate, a second plate formed to nest adjacent the first plate with a gap between the first and second plates, a porous material disposed between the plates, a sealing layer disposed between the first and second plates such that the porous material is sealed from ambient at a pressure less than ambient, a duplicate set of first and second plates having a porous material and sealing layer formed to mate with the first and second plates to form a chamber, and a device disposed within the chamber that is thermally insulated from ambient by the enclosure.

12. The thermal insulation enclosure of example 11 wherein the first and second plates and duplicate first and second plates comprise a substantially planar portion and sides, wherein the sealing layer is disposed between sides of the first and second plates, and wherein the sides of each set of plates align to form the chamber.

13. The thermal insulation enclosure of any of examples 11-12 wherein the device within the enclosure comprises a fuel cell based power generator.

14. The thermal insulation enclosure of any of examples 11-13 wherein the enclosure includes a path from ambient to allow ambient oxygen to reach the device.

15. The thermal insulation device of any of examples 11-14 wherein the sealing layer comprises a polymer material and a metal layer disposed between the polymer layer and ambient.

16. The thermal insulation device of any of examples 11-14 wherein the porous material comprises an open cell material including a low-density mixture of fumed silica, fiberglass, and silicon carbide.

17. An example method includes pressing a porous material between two plates such that the plates are separated from each other by a gap defined by the porous material, and in a partial vacuum, depositing a conformal sealing layer to cover the porous material in the gap between the two plates to form a gas seal of the porous material from ambient and maintain the partial vacuum.

18. The method of example 17 wherein the porous material comprises a mixture of fumed silica, fiberglass, and silicon carbide.

19. The method of example 17 wherein the sealing layer comprises a polymer material and a metal layer disposed between the polymer layer and ambient.

20. The method of any of examples 17-19 and further comprising forming multiple sets of such plates and bringing two sets together to create an enclosure with a chamber, and further comprising placing a device within the chamber such that is thermally insulated from ambient.

Although a few embodiments have been described in detail above, other modifications are possible. For example, the process flows may not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An enclosure for a fuel cell-based power generator comprising:
   a first partial enclosure comprising:
   a first set of plates comprising:
     a first plate; and
     a second plate formed to nest adjacent the first plate with a gap between the first and second plates;
   a first porous material arranged in the gap between the first and second plates; and
   a first sealing layer and a second sealing layer, wherein the first sealing layer and the second sealing layer are disposed between the first and second plates such that the first porous material is sealed from ambient at a pressure less than ambient, and wherein the first sealing layer and the second sealing layer are each separate from the first porous material;
   wherein the first and second plates comprise a substantially planar portion and sides, and wherein the sealing layer is arranged between sides of the first and second plates;
   a second partial enclosure comprising:
   a second set of plates comprising:
     a third plate; and
     a fourth plate formed to nest adjacent the third plate with a gap between the first and second plates;
   a second porous material arranged in the gap between the third and fourth plates; and
   a third sealing layer and a fourth sealing layer, wherein the third sealing layer and the fourth sealing layer are disposed between the third and fourth plates such that the second porous material is sealed from ambient at a pressure less than ambient, and wherein the third sealing layer and the fourth sealing layer are each separate from the first porous material;
   wherein the first set of plates comprises a first substantially planar portion, a first side extending from the first substantially planar portion, and a second side extending from the first substantially planar portion, and wherein the second set of plates comprises a second substantially planar portion, a third side extending from the second substantially planar portion, and a fourth side extending from the second substantially planar portion;
   wherein the first sealing layer is disposed at the first side, the second sealing layer is disposed at the second side, the third sealing layer is disposed at the third side, and the fourth sealing layer is disposed at the fourth side, and
   wherein the first and second enclosures are separated from one another at the first and second sides, with one of the first and second sides allowing at least oxygen from ambient to reach a fuel cell-based power generator therein.

2. The enclosure for a fuel cell-based power generator of claim 1 wherein the porous material is a nano-porous material comprising an open cell material.

3. The enclosure for a fuel cell-based power generator of claim 1 wherein the porous material is a nano-porous material comprising a low-density mixture of fumed silica, fiberglass, and silicon carbide.

4. The enclosure for a fuel cell-based power generator of claim 1 wherein the porous material comprises a getter material.

5. The enclosure for a fuel cell-based power generator of claim 1 wherein the pressure is between approximately 0 and 1000 Pa (Pascal-Newtons/Meter$^2$).

6. The enclosure of claim 1, wherein at least one of the first sealing layer, the second sealing layer, the third sealing layer, and the fourth sealing layer further comprises:
   a polymer; and
   a metal layer that covers the polymer.

7. The enclosure of claim 1, wherein the first sealing layer comprises:
   a polymer; and
   a metal layer that covers, and is in contact with, the polymer, wherein the metal layer is limited to a location at the first side between the first plate and the second plate.

8. A method of forming an interior pocket of ambient environment enclosure for a fuel cell-based power generator, the method comprising:
  forming a first partial enclosure by:
    pressing a first porous material between a first set of plates comprising a first plate and a second plate such that the first plate and the second plate are separated from each other by a gap defined by the porous material, wherein the first set of plates comprise comprises a first substantially planar portion, a first side extending from the first substantially planar portion, and a second side extending from the first substantially planar portion;
  forming a second partial enclosure by:
    pressing a porous material between a second set of plates comprising a third plate and a fourth plate such that the-third plate and the fourth plate are separated from each other by a gap defined by the porous material, wherein the second set of plates comprises a second substantially planar portion, a third side extending from the second substantially planar portion, and a fourth side extending from the second substantially planar portion; and
  in a partial vacuum,
    depositing a first conformal sealing layer on a surface of the porous material in the gap to form a first gas seal between the first and second plates at the first side,
    depositing a second conformal sealing layer on a surface of the porous material in the gap to form a second gas seal between the first and second plates at the second side;
    depositing a third conformal sealing layer on a surface of the porous material in the gap to form a third gas seal between the third and fourth plates at the third side; and
    depositing a fourth conformal sealing layer on a surface of the porous material in the gap to form a fourth gas seal between the third and fourth plates at the fourth side;
  physically separating the first and second partial enclosures from one another to form an interior pocket of ambient environment;
  pocket; and
  placing a fuel cell-based power generator within the pocket such that the fuel cell-based power generator is partially thermally insulated from ambient; and,
    wherein the first and second enclosures are separated from each other to allow at least oxygen from ambient to reach the fuel cell-based power generator.

9. The method of forming an interior pocket of ambient environment enclosure for a fuel cell-based power generator of claim 8, wherein the first and second partial enclosures are completely physically separated from one another.

10. The method of forming an interior pocket of ambient environment enclosure for a fuel cell-based power generator of claim 9, wherein based on dimensions of the first set of plates and the second set of plates, the fuel cell-based power generator is positioned between i) the first and second sides and ii) the third and fourth sides.

11. The method of forming an interior pocket of ambient environment enclosure for a fuel cell-based power generator of claim 8, wherein at least one of the first conformal sealing layer, the second conformal sealing layer, the third conformal sealing layer, and the fourth conformal sealing layer further comprises:
  a polymer; and
  a metal layer that covers the polymer.

* * * * *